（12） United States Patent
Knight et al.

(10) Patent No.: US 11,008,143 B2
(45) Date of Patent: May 18, 2021

(54) CLOSURE FOR CONTAINER WITH INFORMATIONAL AND/OR ANTI-COUNTERFEITING CAPABILITIES

(71) Applicant: RIEKE LLC, Auburn, IN (US)

(72) Inventors: Simon Knight, Brigend (GB); David Pritchett, Ashby de la Zouch (GB)

(73) Assignee: RIEKE LLC, Auburn, IN (US)

( * ) Notice: Subject to any disclaimer, the term of this patent is extended or adjusted under 35 U.S.C. 154(b) by 0 days.

(21) Appl. No.: 16/479,407

(22) PCT Filed: Jan. 23, 2018

(86) PCT No.: PCT/US2018/014825
§ 371 (c)(1),
(2) Date: Jul. 19, 2019

(87) PCT Pub. No.: WO2018/136927
PCT Pub. Date: Jul. 26, 2018

(65) Prior Publication Data
US 2019/0382173 A1   Dec. 19, 2019

Related U.S. Application Data

(60) Provisional application No. 62/592,453, filed on Nov. 30, 2017.

(30) Foreign Application Priority Data

Jan. 23, 2017 (GB) ..................... 1701133

(51) Int. Cl.
*B65D 55/02* (2006.01)
*H04W 4/80* (2018.01)
*B65D 50/04* (2006.01)

(52) U.S. Cl.
CPC .......... *B65D 55/028* (2013.01); *B65D 50/04* (2013.01); *H04W 4/80* (2018.02); *B65D 2203/10* (2013.01); *B65D 2211/00* (2013.01)

(58) Field of Classification Search
CPC ... H04W 4/80; G06K 19/086; G06K 19/0723; G06K 19/0707; B65D 55/028;
(Continued)

(56) References Cited

U.S. PATENT DOCUMENTS

| 4,446,979 A * | 5/1984 | Gach ............... B65D 55/026 |
| | | 215/203 |
| 5,638,970 A * | 6/1997 | Garby ............... A61J 7/04 |
| | | 116/308 |

(Continued)

OTHER PUBLICATIONS

Patent Cooperation Treaty (PCT), International Search Report and Written Opinion for Application PCT/US2018/014825 filed Jan. 23, 2018, dated Mar. 22, 2018, International Searching Authority, US.

*Primary Examiner* — Joseph H Feild
*Assistant Examiner* — Sharmin Akhter
(74) *Attorney, Agent, or Firm* — McDonald Hopkins LLC

(57) ABSTRACT

A "smart" closure system, apparatus, and method are contemplated. The closure includes mechanical capture and release mechanisms, electromechanical and/or optical indicators, wireless technologies, and/or web-based or remote authentication, verification, and serialization via remotely located data servers. A mobile computing device may further augment certain functions. The resulting system allows for anti-counterfeiting, authentication, serialization, and other capabilities.

15 Claims, 9 Drawing Sheets

(58) Field of Classification Search
CPC ............... B65D 50/04; B65D 2211/00; B65D 2203/10; B65D 41/32; B65D 55/12; B65D 55/026; B65D 2203/12; B65D 2203/06; B65D 41/045; B65D 2401/15
See application file for complete search history.

(56) References Cited

U.S. PATENT DOCUMENTS

| | | | |
|---|---|---|---|
| 2005/0242957 A1* | 11/2005 | Lindsay | G06K 19/07345 340/572.7 |
| 2007/0182563 A1 | 8/2007 | Abbott | |
| 2007/0296599 A1 | 12/2007 | Wang et al. | |
| 2010/0141384 A1* | 6/2010 | Chen | H04B 5/0062 340/10.1 |
| 2012/0228388 A1 | 9/2012 | Kuo et al. | |
| 2014/0262897 A1 | 9/2014 | Smith et al. | |
| 2020/0050912 A1* | 2/2020 | McCormick | H01Q 1/2208 |

* cited by examiner

CLOSURE FOR CONTAINER WITH INFORMATIONAL AND/OR ANTI-COUNTERFEITING CAPABILITIES

CROSS-REFERENCE TO RELATED APPLICATION

This application is a 35 U.S.C. 371 national stage filing of PCT Application No. PCT/US2018/014825 filed on Jan. 23, 2018, which claims priority to United Kingdom Patent Application Number 1701133.9, filed on Jan. 23, 2017, and U.S. Provisional Patent Application No. 62/592,453, filed on Nov. 30, 2017. Each of these earlier applications includes at least one of the above identified inventors, and are hereby incorporated by reference as if fully rewritten herein.

TECHNICAL FIELD

The present invention relates generally to a "smart" closure, including a variety of constructions and methods, which impart deterrence to counterfeiting and tampering and/or enable delivery authentication and other information by third parties and end users concerning the origin, quality, and history of the container and, by extension, its contents.

BACKGROUND

Generally speaking, both commodities and more sophisticated products are sometimes subject to tampering and/or counterfeiting. Although basic measures have been developed by manufacturers to address these concerns, recent improvements in printing and other technologies have made it easier for bad actors to copy or otherwise co-opt the packaging of well-known products and/or to improperly reuse that packaging.

A wide variety of product authentication and counterfeit deterrence features and constructions are disclosed in the prior art. An extensive discussion of these earlier features and constructions is provided in U.S. Pat. No. 9,280,696 which issued Mar. 8, 2016. The '696 patent is hereby expressly incorporated by reference for the entirety of its prior art discussion and for its summary of earlier patent references.

One previous approach was to use a physical barrier, such as breakable plastic wrap and/or foil seal. While these barriers provide a clear indication that the closure has been compromised, they do not and cannot provide any additional information or way to verify where the container has been or what was originally placed inside of it.

Separately, barcodes and other visual indicia have been used on packaging containers for identification purposes. These systems generally require dedicated scanners, as well as standardization and/or a third party intervention to establish and maintain rules (e.g., GS1 in Brussels, Belgium coordinates assignment of the twelve digit Universal Product Codes (UPC) that are prevalent in many countries, including the United States). Also, because the barcodes must be predetermined and affixed to individual containers during manufacture, any authentication scheme afforded by these codes is relatively static and passive (i.e., they cannot be easily altered or expanded once the container is filled and delivered by the manufacturer).

Separately, wireless communication tags are also becoming more common. These tags are affixed to a wide range of articles in commerce, thereby enabling wireless communication of information in a centralized database/authentication scheme similar to the aforementioned barcodes and/or by directly communicating with a dedicated device to decode and display information carried by the tag.

Near Field Communication (NFC) tags, Radio Frequency Identification (RFID) tags, and Bluetooth communication devices are commonly used for this purpose. NFC tags are small wireless tags that permit communication with an NFC reader device over distances of up to about 20 cm. RFID tags are small wireless tags that permit communication with an RFID reader device over larger distances, typically up to 15 m. Both types of wireless tag communicate via electromagnetic (EM) radiation.

In recent years, the increased functionality of portable electronics (i.e. mobile phones and tablet PCs) has enabled such devices to be used as readers for communicating with such wireless communication tags. As an example, NFC tags, RFID tags, and Bluetooth devices have been incorporated into various consumable products, thereby enabling consumers to interact with such products using mobile phones.

These more dynamic, wireless systems that are responsive to user needs, but they tend to overlook anti-counterfeiting and tampering protections provided by the more traditional methods. A system, method, and apparatus that combined these functions would be welcome. Specifically, structures to seamlessly accommodate the circuitry, power sources, visual identifiers, and other mechanisms for achieving improved anti-counterfeiting, anti-tampering, and verification systems in a single item are needed.

SUMMARY OF INVENTION

The inventions contemplated herein are generally directed toward the goals of: (i) impeding a bad actor's ability to place counterfeit products in a given container; (ii) preventing anyone from tampering with the product carried in that container or, at a minimum, providing easily recognized indicia to an end user that such tampering has occurred; and (iii) enabling any actor within a supply chain (e.g., the manufacturer, the wholesaler, the retailer, and the end user/consumer) to access information and enhance their experience with the product associated with that container. These and other goals may be attained through the use of any combination of the embodiments and other aspects described below. Generally speaking, the containers and associated methods for attaining at least some of these goals are referred to herein as a "smart" or "intelligent" closures.

In some embodiments, the container is fitted with a closure that captures tracking and/or identification indicia. These indicia may be visual (e.g., a QR code, a bar code, etc.), conductive (e.g., conductive ink, selectively connectible circuits, etc.), and/or wirelessly generated (near field communications systems, connectivity to remote servers via a personal computing device, etc.). As used herein, near field communication may encompass NFC, RFID, Bluetooth, and other similar technologies and protocols. Additionally, the tracking and identification indicia is incorporated within a unique structure that impedes tampering and/or provides an indication once the closure is initially opened or removed.

In one aspect, one or more features are integrated within the closure to achieve the above-noted goals. These features include, at their broadest level, electro-mechanical and purely mechanical capture and release mechanisms, web-based verification, authentication or serialization methods, optical indicators, and wireless detection mechanisms. Each of these features may be categorized as active (i.e., ones that include interaction between a user and the feature and/or information-retrieval systems from a trusted source) or passive (i.e., static systems in which information may be encoded or carried within the closure, preferably without the need for memory or power circuits). Although the individual structures embodying these features are necessarily either active or passive, it is possible—and sometimes even desirable—to combine a series of different features to provide a robust closure that is capable of attaining the above-noted goals in a variety of ways.

The disclosed embodiments enable consumer engagement (e.g., establishing profiles, providing reminders, etc.), as well as the ability to measure, track, and report on products via the active features described herein. In turn, the various embodiments and aspects may promote consumer confidence, enhance logistics operations, verify product quality, provide an opportunity for users to voluntarily provide additional information and/or create profiles which may be paired to the product and its use.

In one particular embodiment, the invention may include any combination of the following features:
- a cap rotatably attachable to the opening;
- a disc fitted on an underside facing of the cap so as to retain the disc between the cap and the container when a closing torque is applied to attach the closure to the opening;
- wherein at least one anti-back off post is formed on the disc so that, when an opening torque is applied to release the closure from the container, the anti-back off post(s) engage the closure to cause the cap to rotate in comparison to the disc;
- wherein a viewing aperture is provided on the cap so as to selectively reveal indicia on the disc when at least one of the closing torque and the opening torque is applied;
- a receptacle formed on the disc to receive a corresponding protrusion formed on the cap so as to snap-fit the disc and the cap when the closing torque is applied;
- at least one anti-rotation ribs on the underside facing of the cap so as to allow the disc to rotate in only one direction;
- a receptacle formed on the cap to receive a corresponding protrusion formed on the disc so as to snap-fit the disc and the cap when the torque is applied to attach the closure;
- at least one anti-rotation ribs on the underside facing of the cap so as to allow the disc to rotate in only one direction;
- wherein the cap includes a central section;
- wherein the central section includes serialization indicia;
- wherein the serialization indicia is formed by one of a label, inject printing, and mold serialization;
- wherein at least one tab bridge initially attaches the central section to a periphery portion of the cap and wherein said tab bridges become disconnected upon engagement of the anti-back off post(s);
- wherein a conductive ink or a conductive resin is associated with the tab bridge to create an electrical flowpath between features provided proximate to the central section and features provided proximate to the periphery portion;
- a power source connected to the electrical flowpath;
- wherein the features provided proximate to the central section include at least one raised contact on an externally exposed surface of the closure;
- wherein the features provided proximate to the periphery section include at least one raised contact on an externally exposed surface of the closure;
- wherein the electrical flowpath is formed on the underside facing of the cap;
- a tag connected to the electrical flowpath;
- a tag is positioned between or proximate to at least one of the cap and the disc;
- wherein the tag includes at least one: electro-mechanical indicators, web-based verification tag, serialization indicia, optical identifiers, and a wireless communication tag;
- wherein a conductive resin is provided via a two-shot molding process to impart an electrically conductive feature to at least one of the cap and the disc;
- wherein a two-shot molding process is used to form the serialization indicia;
- wherein a plurality of anti-back off posts are formed along an outer most circumference of the disc;
- wherein anti-rotation ribs are formed within the central section to facilitate rotation of a peripheral edge of the cap in comparison to the disc; and
- wherein the central section of the cap remains coupled to the disc when the peripheral edge of the cap rotates.

Still other specific embodiments contemplate any combination of the elements in the preceding paragraph and/or dispensing pump, including one or more tags. Solenoids, sensors, and the like may be included. A power source, such as a transducer, can be located on or within the dispensing pump to enable use of the tag(s) for any of the purposes described herein.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 6A is a perspective view of the top of a closure similar to that contemplated in FIG. 2, while

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A closure for sealing a container is contemplated. The container and closure combination may have any number of features that are commonly encountered in this field, including but not limited to a screw fit arrangement between the closure and the container to allow the closure to selectively removed and refitted. When fitted, the combination may form a watertight and/or hermetic seal.

The descriptions and drawings in this disclosure, and any written matter within the drawings should be deemed to be reproduced as part of this specification. In all cases, a closure is affixed to a container, thereby necessitating a threaded or other rotating connection and disconnection between these components. Significantly, the initial rotation to secure/affix the closure may provide sufficient compression to lock the components in place (if such action does not already occur in the initial manufacture) while, conversely, the initial attempt to loosen and remove the closure engages, initiates, or otherwise enables the desired functionality with respect to anti-counterfeiting, anti-tampering, authentication/verification, or other informational purposes.

The invention contemplates a combination of active and, optionally, passive features. Generally speaking, these features can be characterized according to the groupings discussed below. It will be understood that these groupings are not mutually exclusive and, in some instances, a single component can be by several different groupings (e.g., a capacitive ink could be both an optical indicator, a wireless technology, and an electromechanical indicator).

Mechanical Capture and/or Release

Figure 1A:
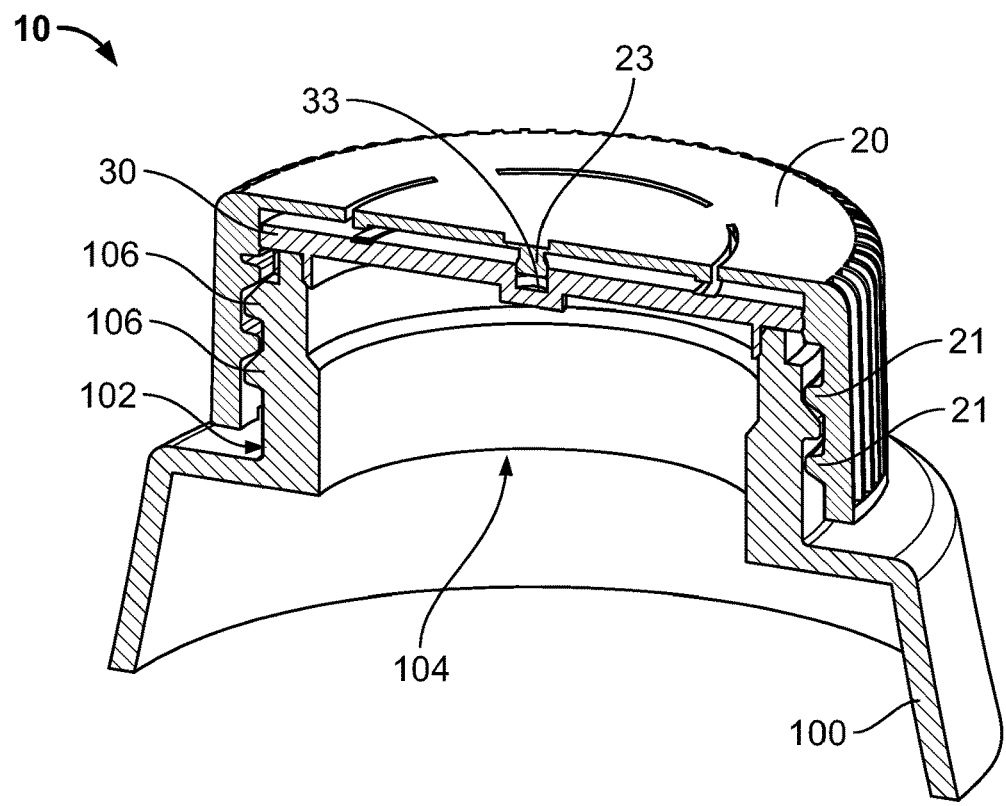
FIGS. 1A and 1B are cross sectional perspective views to illustrate the two-piece, disc-and-cap construction of a closure structure according to certain embodiments, with the former showing the pieces before torque is applied and the latter showing after torque is applied so as to snap the pieces together (e.g., to secure the closure to a container).
Figure 1B:
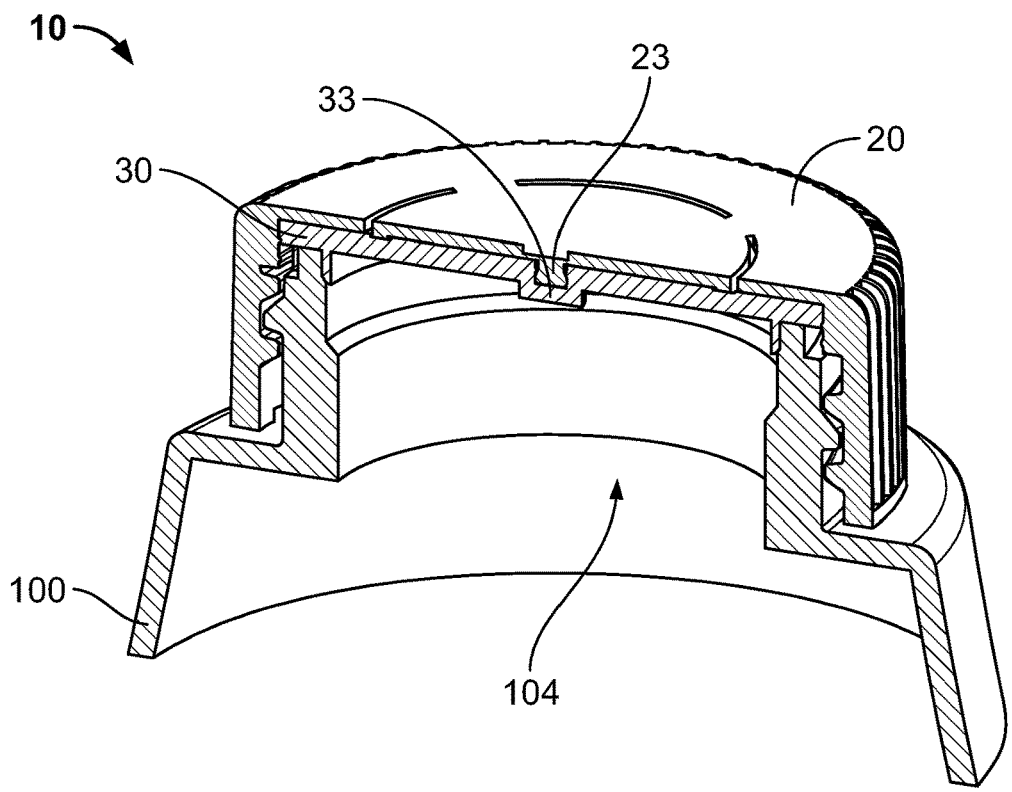
Figure 2:
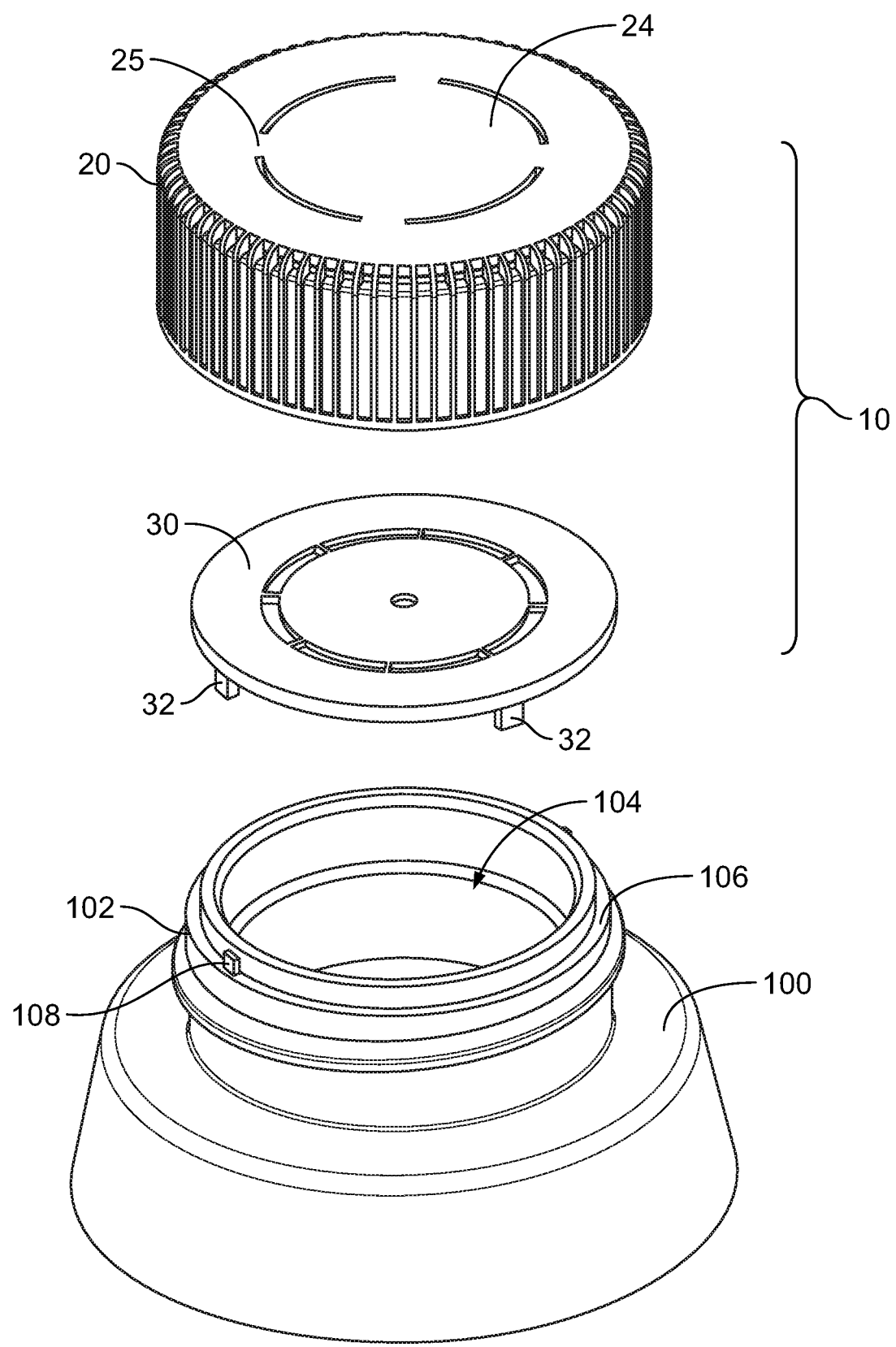
FIG. 2 is an exploded perspective view of the closure contemplated in FIGS. 1A and 1B.
Figure 3:
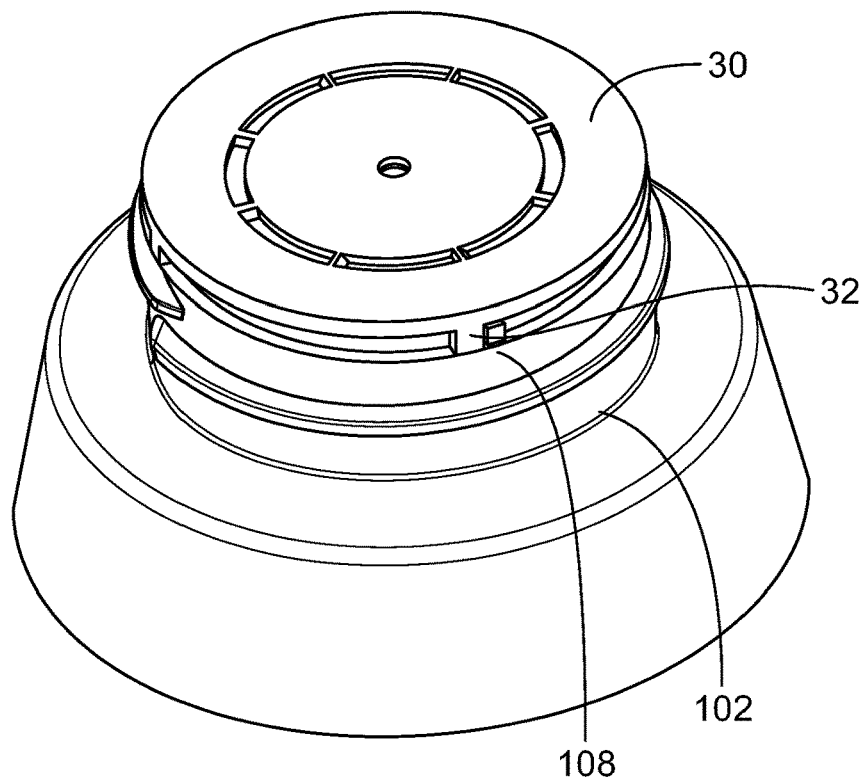
FIG. 3 is a partially assembled perspective view of the closure contemplated in FIG. 2 showing the disc as it might rest on the container.
Figure 4:
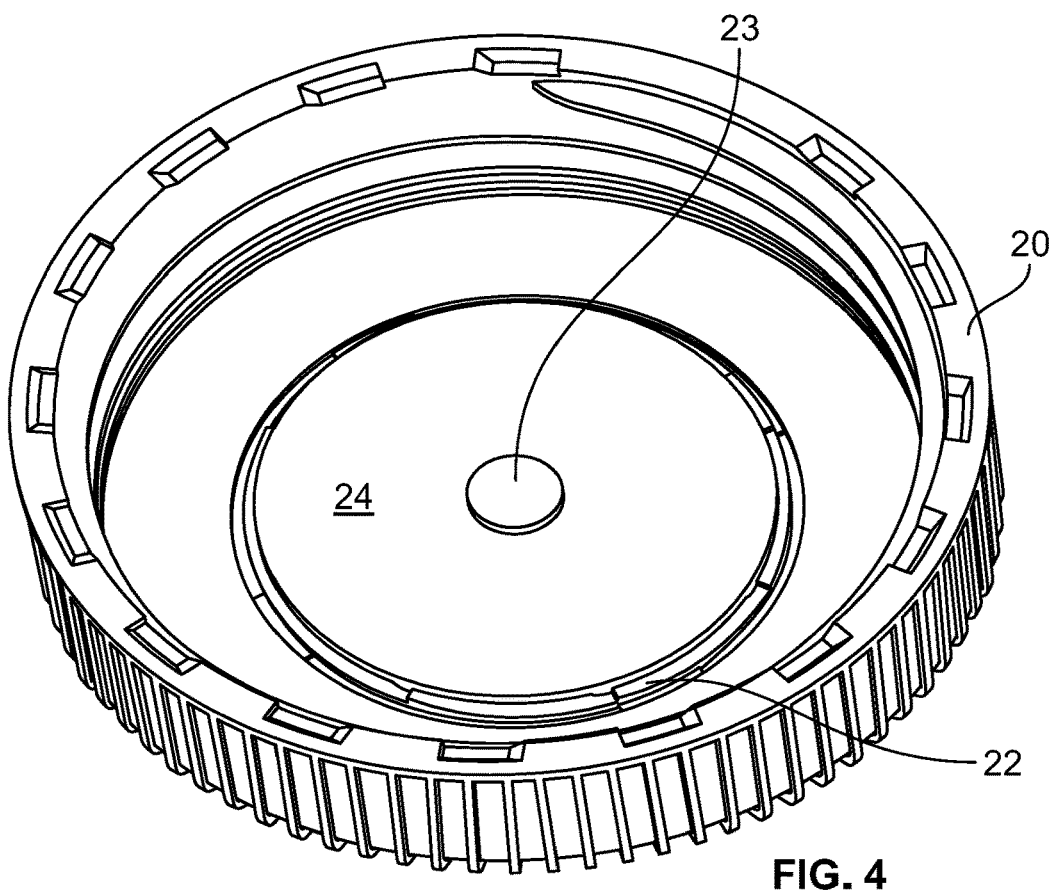
FIG. 4 is a partially assembled perspective view of the closure contemplated in FIG. 2 showing the underside of the cap, including anti-rotation ribs that can engage the disc.

With reference to FIGS. 1A through 3, a screw top closure 10 has a two piece design. An outermost cap 20 includes threads, flanges, tabs, or other means to affix cap 20 to container 100 with corresponding structure on neck 102, thereby sealing the container opening 104. Along its inner facing, cap 20 retains an inner disk 30 with anti-back off ribs 32 (as seen in FIGS. 2-4) to limit the rotation of the inner disk 30.

When the cap 20 is fitted to the container 100, the threads 21 (or other engagement mechanisms) secure the closure 10 to the container 100 by way of corresponding threads 106. The back-off ribs 32 come into contact with corresponding posts, ribs, or stops 108 formed near the opening 104 along the neck 102, while the inner disk 30 itself is compressed against the inner facing (i.e., the underside) of the cap 20.

Notably, the ribs 32 need only have a thickness of less than 3.00 mm (as measured in a transverse plane relative to the longitudinal axis of the container), and more preferably less than 2.50 mm or even less than 2.0 mm, although in all cases the thickness of the ribs will be discernibly greater than the thickness of the container itself (i.e., its average thickness and/or its average thickness within the neck area). In this manner, significant savings can be realized owing to the reduced volume of materials required in comparison to known container designs employing backoff ribs for other purposes.

A post 23 may be formed along the inner facing of the cap 20. Post 23 is urged into a receptacle 33 formed on the corresponding facing of the disc 30. The converse (post on the disc and receptacle on the cap) is also possible. Thus, when the closure 10 is initially tightened/affixed onto the container 100, the post 23 is urged into the receptacle 33 to hold the cap 20 and disc 30 together. Multiple post-receptacles may be formed, despite the fact only one centralized pair is depicted in these drawings. Also, by holding the cap 20 and disc 30 together in this fashion, the anti-rotation ribs 22 (as described below) can function effectively.

As seen in FIG. 4, additional anti-rotation ribs 22 are provided on the inner facing of the cap 20 to engage corresponding structures on the disc. Ribs 22 may possess a wedge-like shape to allow rotation in one direction but not the reverse direction. In this manner, once the disc 30 rotates relative to the cap 20, it cannot return to its original position.

Figure 5A:
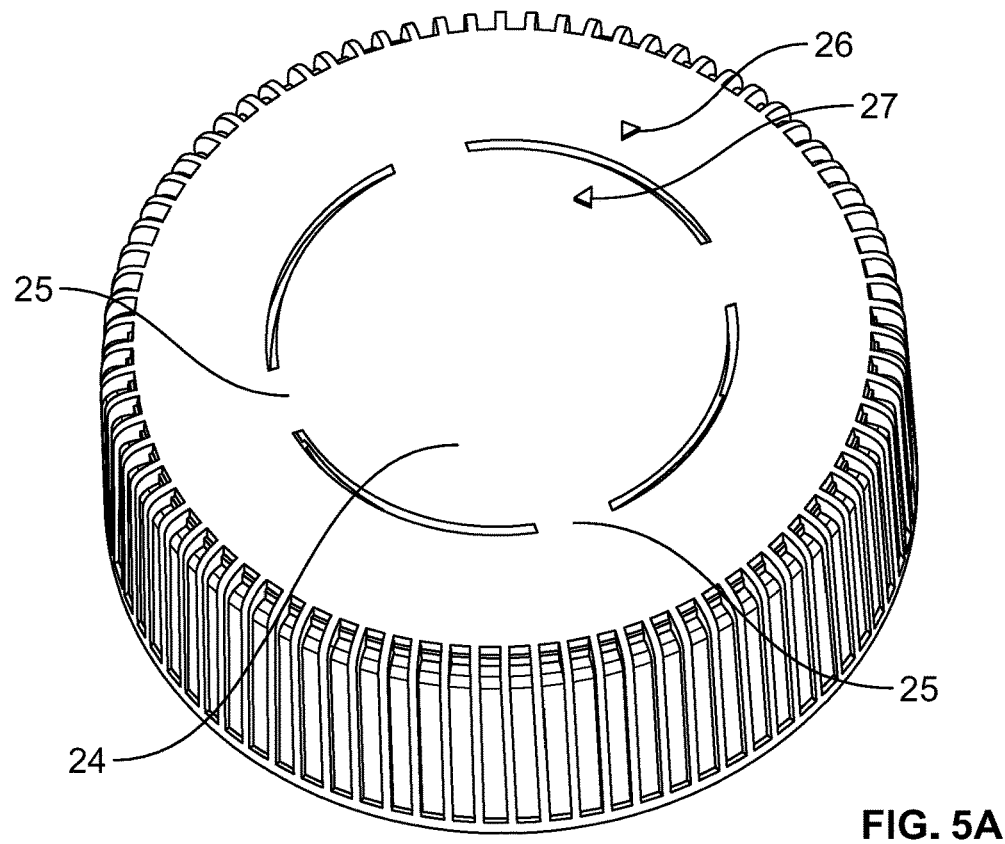
FIG. 5A is a perspective view of the top of the closure contemplated in FIG. 2, showing inject printed numbering linked to batch information for anti-counterfeiting color identification and/or serialization. Additionally, indicia on the cap and disc are aligned to confirm the closure has not been opened/rotated.
Figure 5B:
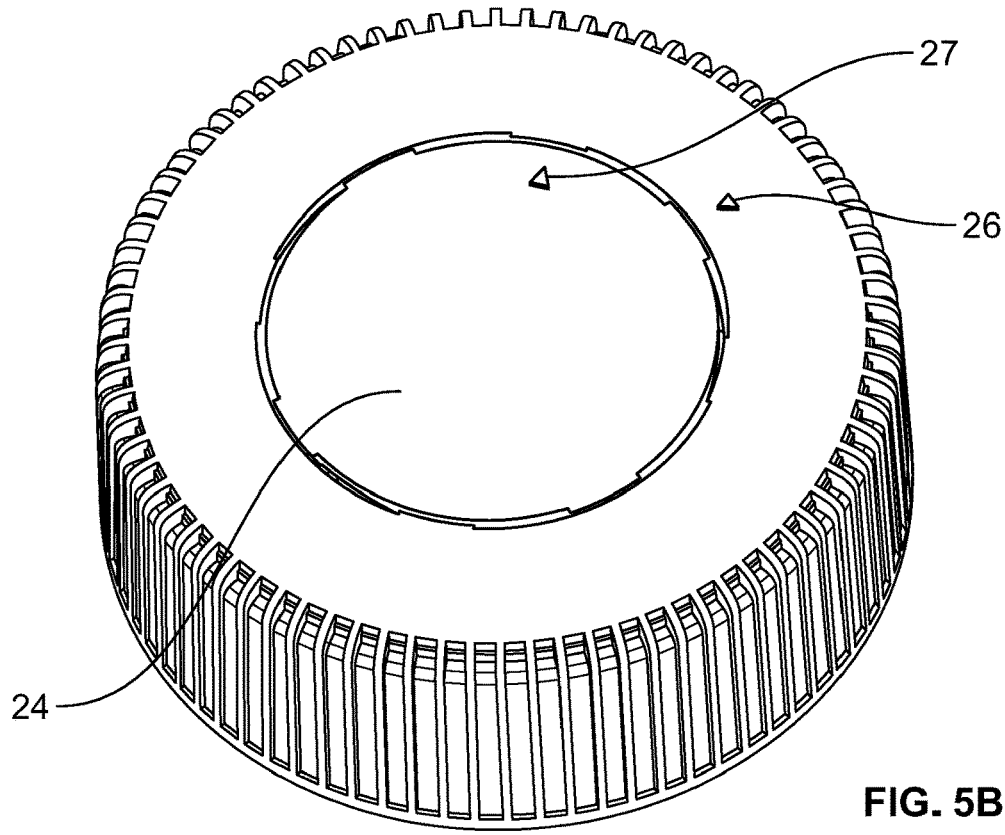
FIG. 5B is a perspective view of the top of the closure contemplated in FIG. 2, but showing in mold serialization by way of two shot molding processes and/or labeling for anti-counterfeiting color identification and/or serialization. Also in contrast to FIG. 5A, the indicia on the cap and disc are misaligned to provide an additional indication of opening or possible tampering.
Figure 6A:
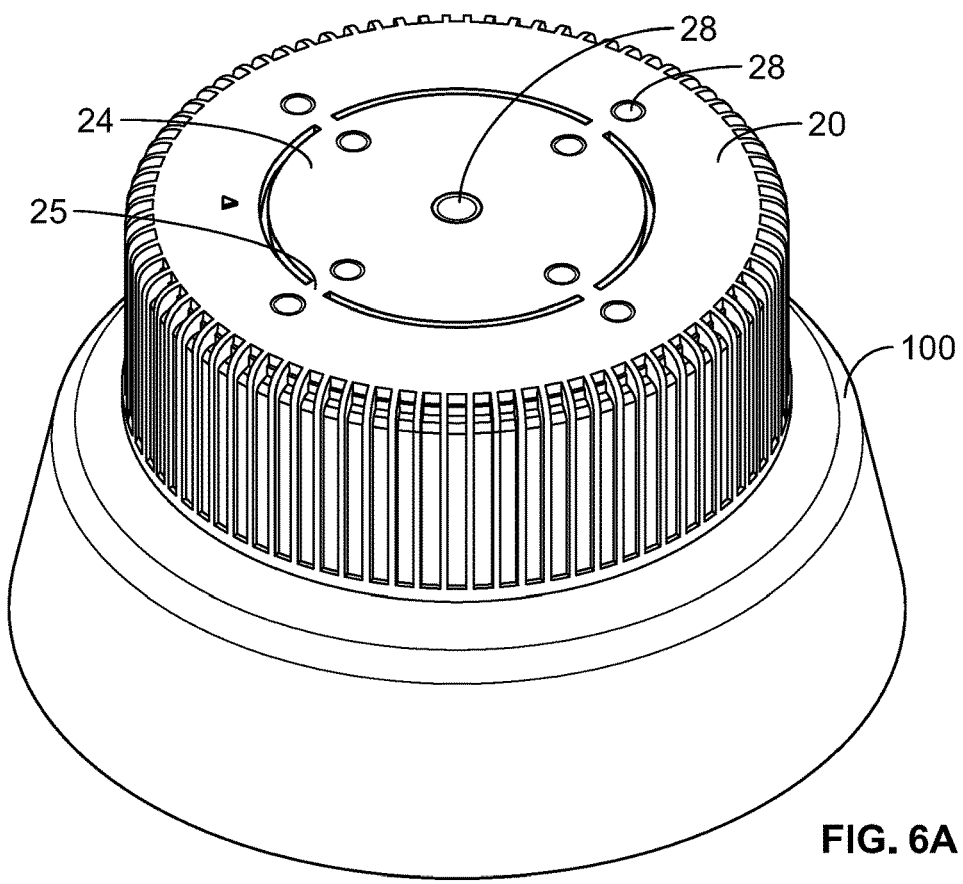
Figure 6B:
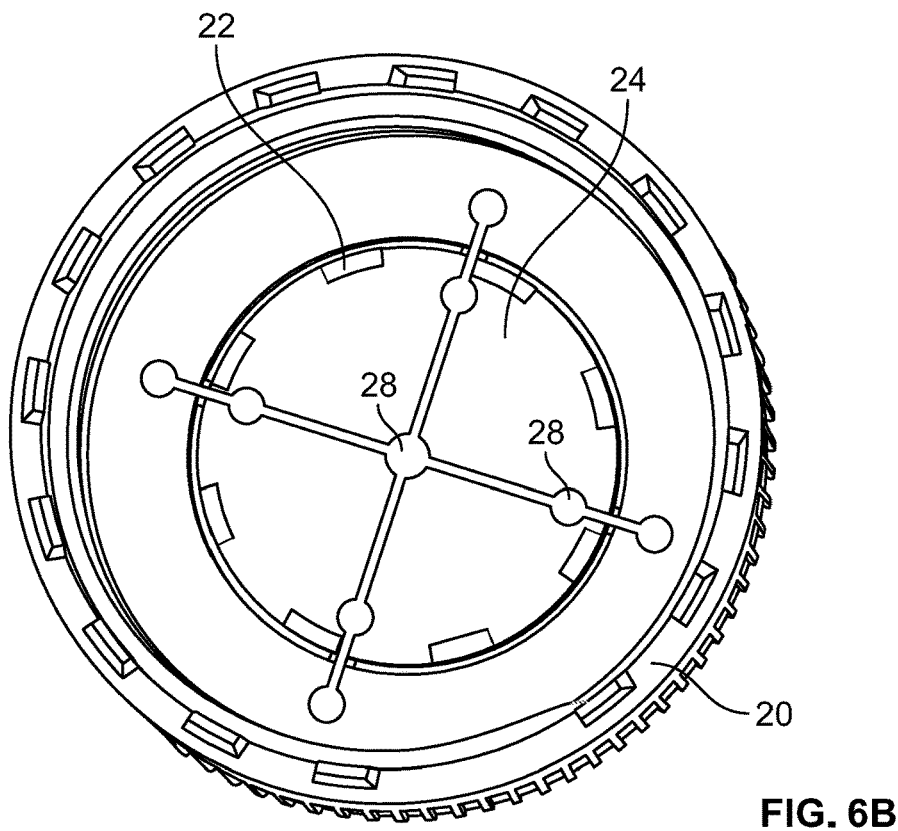
FIG. 6B is a perspective view taken from the bottom and FIG. 6C is a sectional, perspective view of the top taken at an angle to better emphasize the raised nature of the conductive resin points. In all of FIGS. 6A, 6B, and 6C, one or more conductive resins are provided, via one or two shot molding, along initially aligned portions of the cap and disc, so as to allow electrical flow that can be initiated and detected according to the various schemes disclosed herein.
Figure 6C:
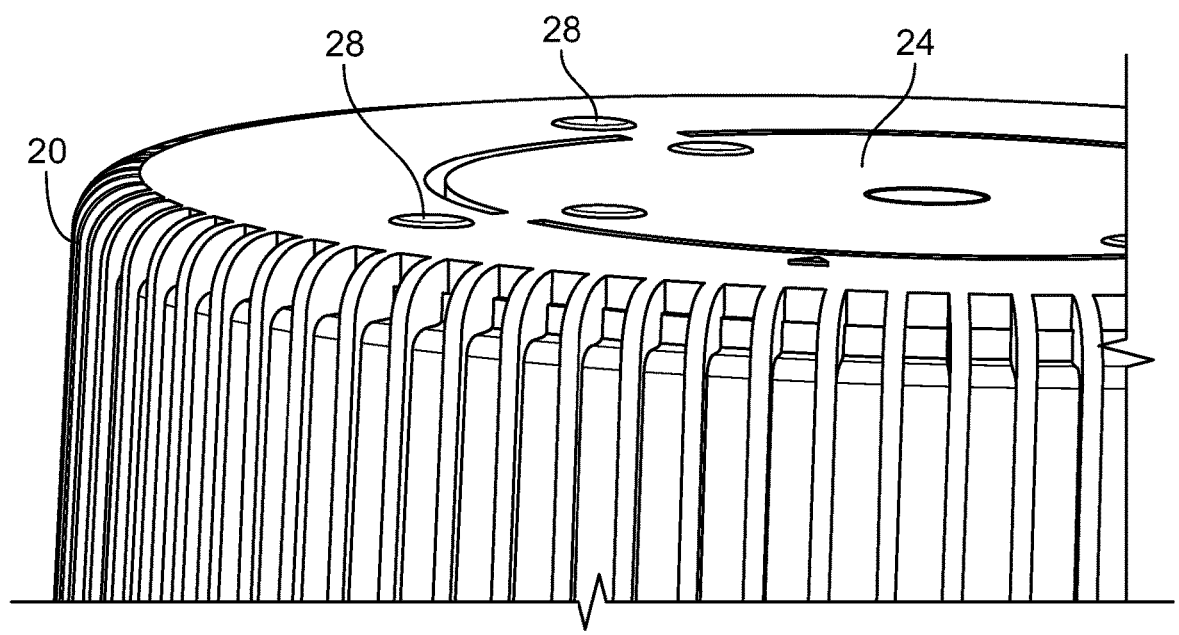

The significance of ribs 22 is best understood with reference to FIGS. 5A and 5B. A central section 24 is concentrically located on the top of cap 20. This section 24 may be connected to the outer periphery of the cap 20 by way of bridging tabs 25. The tabs 25 will be of a construction to allow them to break/disconnect the central section 24 from the remainder of cap 20, particularly when the anti-rotation ribs 22 are engaged. Thereafter, section 24 moves in concert with disc 30.

In turn, indicia or markings 26, 27 are provided separately on the cap periphery and the central section 24. Thus, when section 24 rotates, the indicia 26, 27 move relative to one another, with this misalignment providing an indication of tampering/opening of the container. In other embodiments, it is possible for a viewing window to be formed in central section 24 to expose an initial indicator on the top-facing of the disc 30. Thus, when section 24 rotates, this initial indicator is no longer visible. Of course, in order for section 24 to rotate relative to the periphery of cap 20, the bridges 25 (if present) must be disconnected/broken).

Also as seen in FIGS. 5A, 5B, and elsewhere, a serialization number may be provided on the cap 20; for example, within the central section 24. The number may serve as a unique identifier for that cap/container combination (i.e., the product), as well as to accomplish any of the other objects described below. The number may be printed, etched, stamped, labeled, or integrally formed (e.g., by way of one or two shot molding). In place of or in addition to a serialization number, other optical indicators (as described below) can be incorporated in a similar manner.

In some aspects, the ideal thickness of the back off ribs provided on the container neck can be expressed relative to as a ratio in comparison to the standardized dimensions of bottle openings, as defined by the Glass Packaging Institute (GPI) and/or Society of Plasitics Industry (SPI). The thickness of the ribs may be any one one-hundredth integer between 1.00 mm and 3.00 mm, while the inner diameter may be 400, 410, 415, 425, 430, 2030, or 2035 sized. Any combination of these disclosed aspects are included.

The inner facing of the cap also contains anti-rotation ribs and an optional snap fit post that is received within a recess on the inner disk (conversely, the disk may be provided with a post and the cap with a corresponding recess). In either case, these structures on the inner facing of the cap cooperate to allow only partial rotation of the inner disk when the closure is tightened and then released (e.g., via rotation and/or torque). Further, because the initial tightening causes the post to be snap-fitted into the recess, this partial rotation is effectively irreversible (i.e., the cap and inner disk cannot easily be reset to their original positions).

Thus, by providing separate indicators the cap and the inner disk, the user to quickly verify that the closure has been previously removed from the container. In turn, the user can be assured that the container has not been tampered with or surreptitiously refilled.

The indicators could be as simple as arrows that are aligned when the closure is secured onto the container. Thus, a gap or series of gaps may be visible on the outer facing of the cap/closure, and the arrows would not be aligned when the closure is initially released from the container.

Alternatively, the indicator could be a stress-induced structure that is at least temporarily attached to the cap and inner disk. The stress-induced structure would break, change color, or provide some other visual when sufficient rotation/torque is applied to initially release the closure. Any number of polymers may be suitable to provide stress-induced indications contemplated herein.

Electromechanical Indicators

An electrical circuit and/or electrically powered component can be incorporated into the structure described above. That is, a conductive material (e.g., metal, metal wire, conductive polymer(s), etc.) is formed into the outermost cap and, separately, into the inner disk. When the closure is initially formed, the two separate materials are aligned to allow the flow of electricity therethrough. Conversely, when torque is initially applied, the action of the cap, disk, and back off ribs cause the electrical flowpath to be disrupted so as to eliminate the supply of electricity and enable the anti-counterfeiting and other aims of this invention.

Additionally or alternatively, a conductive polymer may be molded or formed into the outermost cap, the inner disk, or both. Multiple step process (e.g., over-molding, two shot, etc.) could be used to accommodate the use of conductive polymers in combination with conventional polymers. By selectively using conductive polymers in combination with more conventional polymers, it may be possible to minimize costs by limiting the need/volume of expensive resins, improve upon the design and function of the closure by selectively incorporating electrical flowpaths, and/or to enhance the aesthetics and performance of the closure by relying on conventional polymers and/or other materials that provide a wider range of options in these regards. Additionally, two shot processes that minimize conductive resin simplify manufacturing. Notably, threshold levels for conductivity and resistance must be considered when selecting appropriate conductive resins (or other conductive/resistive components disclosed herein) so as to cooperate with cell phones and/or other aspects contemplated herein. Reference can be made to the attachment for further details.

Conductive resin or conductive elements may protrude from the smooth surface of the cap. These elements are also interrupted when the closure is turned. In either or both of these manners, the conductive elements may provide additional means of detection of tampering, as well as potentially serving as frangible elements.

In a similar manner, a conductive foil may be incorporated to define the electrical flowpath(s) between components (e.g., disk and cap, integrated circuit and sensor, etc.). For example, the foil could be captured between the cap and the closure to define an electrical flowpath between these components. In turn, the foil would be torn or physically compromised upon opening/torque being applied to the closure, thereby eliminating the conductive path.

Conductive or inductive ink could be provided to the cap and the disk when in their original, manufactured state (i.e., prior to torqueing/displacement by rotation). Thus, the ink establishes the necessary and detectable electrical flowpath.

The circuit or flowpath could include a simple visual indicator (e.g., activation or deactivation of a light emitting diode or other electrically responsive material). In other embodiments, it may include in its original manufactured state or require a subsequently provided integrated circuit or microprocessor (e.g., a user's hand held mobile device), with the use of additional computing power enabling a host of other web-based, remote access, and/or wireless features. As an example, the capacitive touch features found in touch screen devices (e.g., phones, tablets, etc.) could be utilized as a further interface and connection point to allow for communication to flow from the container/closure to the user (and/or back and forth between remotely based data servers).

A power source may be attached to or contained within the closure to supply power to such electromechanical mechanisms. In one embodiment, a coin cell, button cell, or thin printed battery is encased between or within one of the cap and the disk.

Figure 9:
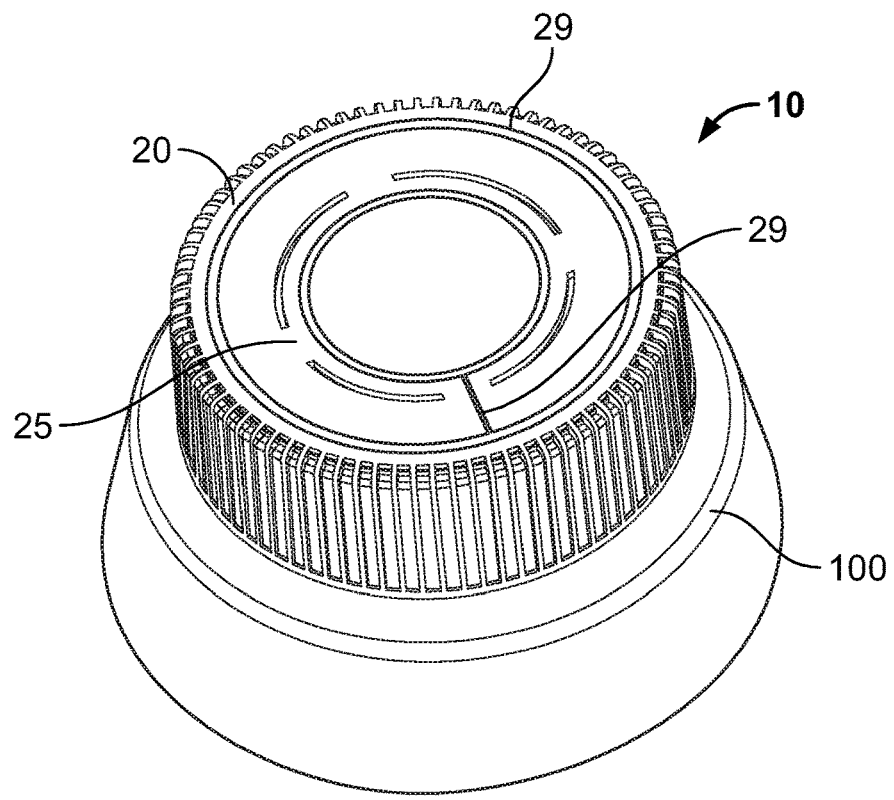
FIG. 9 is a perspective view of a closure similar to that contemplated in FIG. 2, with conductive ink provided on the cap and disc along a tab that is similar in construction and function to those shown in FIGS. 7A and 7B.

With reference to FIGS. 6A through 7B, conductive resin can be molded (or conductive inks can be printed/applied, also as seen in FIG. 9), on the central section 24, at least one of the tab 25, and the periphery of the cap 20. An optional power source can be disposed on either the cap 20 or the central section 24, and a tag or integrated chip could also be used. The conductive resin 28 or ink 29 is in or exposed along the top of the closure 10 so as to allow a user and/or computerized device or reader to touch or come into contact with the resin. The electrical flowpath created thereby can be used for any of the purposes described herein. In some embodiments, the outer facing resin may be slightly raised from the top surface of the closure 10 to simplify these connections/contact. The resin/ink can also be provided solely on the exterior, top facings, rather than both the top and the bottom of cap 20 as shown.

Notwithstanding the foregoing, the power to verify the electrical circuit/connection need not be carried within the closure itself. That is, the closure could be configured so that further user intervention is required to supply power and/or to close the necessary electrical circuit (thereby selectively and temporarily powering the necessary components, such as an LED, integrated chip (IC), or other wireless or sensing device).

In another embodiment, a solenoid or other movable part responsive to electric current could serve as an indicator. These elements could also be provided to serve as a valve, thereby blocking the flow of material through the closure and out of the container under certain circumstances.

Optical Indicators

While some of the foregoing embodiments rely upon visual recognition by the end user, other (usually machine-readable) indicators could be employed. For example, bar codes, QR codes, and other similar optically scanned arrays could be printed on a facing of the disk so that the code is viewable when the closure is sealed. After torque is applied, the disk rotates so that codes cannot be seen. Thus, by relying upon a scanner technology (e.g., an application downloaded to a camera-based device), a user can scan the code and learn from the application as to the nature of the product associated with that code. As will be discussed below, additional technologies could allow for remote interaction (e.g., via a wireless data network) to provide real-time updates and/or to communicate to and update a remotely based server that the product associated with that code has undergone some sort of transformation. In either case, the optical indicator could be used to proactively inform the user as to the contents and history of the closure/container assembly before it is first opened.

Conversely, the optical indicator could be initially concealed from a viewing window until after the product was opened. In this manner, the user is only able to access information after the closure was opened/compromised. In this instance, the user would need to be aware of and informed so as to avoid purchasing a product where the optical indicator was initially visible.

Separately, a photoelectric ink could be coupled to a power source, as noted above, to provide a visual distinction between the closure in its original manufactured state in comparison to after torque has been applied and the disk and cap have moved relative to one another.

In yet another embodiment, an ink that is specifically detectable by a computing device (e.g., capacitive detector, as might be found in a smart phone screen or a specialized color/wavelength that could be detected and verified by a camera) could be employed. In this arrangement, active and/or passive approaches could be used. In the former, the ink could change in response to the opening or closing an electrical flowpath after the closure is displaced, while the later could simply provide a means for verifying the original, manufactured characteristics of the closure and/or container and product to which it is associated. As above, the passive approach could be positioned on one of the closure's movable parts so as to make it viewable only before or after the closure is displaced. Particularly with respect to passive embodiments, the inks used as optical indicators need not be photo- or electrically sensitive and, instead, may simply provide a unique signature that is detectable by a user controlled apparatus.

Wireless Detection Mechanisms

Wireless technologies, including radio frequency identification, near-field communications devices and protocols, and magnetic, capacitive, inductive, or other non-contact detection systems could be provided within the closure to serve the goals defined herein. In these embodiments, the closure needs only to be proximate to a detector (e.g., an end user's hand held or mobile computing device). The detector itself then displays or otherwise communicates information captured by the wireless technology.

Notably, the wireless technology might be as simple as a unique and/or serialized identifier. This identifier is associated with a database which then captures more descriptive information provided or maintained by the manufacturer or retailer. Alternatively, the technology may be programmed to communicate the desired information directly (via the detector) and without the need to communicate with a remotely located server or data provider.

One embodiment contemplates the use of a wireless communication tag. Generally speaking, this tag includes an electronic circuit with information stored thereon. The tag can be activated by a nearby reader device so as to wirelessly transmit the information to the nearby reader device. Information stored on the wireless communication tag pertains to the product within the container or packaging which the tag is associated. This information may be directly read and displayed by the device, or the information from the tag may enable the user, via the device, to engage in the web-based or remote access methods described below.

The wireless communication tag used in the following aspects of the present invention may be an NFC tag, an RFID tag, or a Bluetooth device. Preferably, it is an NFC tag.

A "passive tag" is defined as a tag without its own source of power. When a passive tag receives an electromagnetic (EM) signal from a nearby reader device, a portion of the energy of the signal is converted into a current, thereby powering (and activating) the tag. Passive tags are therefore only capable of transmitting information when activated by a nearby reader device. Passive tags are cheap to produce, and so are well suited for use in disposable or short-life intelligent packaging.

On the other hand, an "active tag" is defined as a tag with its own source of power. Active tags are therefore capable of performing functions other than the simple transmission of information to a reader device. Furthermore, they can perform these additional functions without requiring power from a nearby reader device for activation. Active tags may respond to EM signals, radio signals, or visible or invisible (e.g., infrared) light.

One or more tags may be embedded into a body of the packaging, by insert or over moulding, particularly where one or more active tags are used. Moreover, it may be embedded into a material of the body of the packaging, the container, the dispenser (if present, and/or closure of the container itself. Because the tag is embedded, it is not possible to tamper or copy the tag without visibly altering the appearance of the packaging. Accordingly, counterfeiting is prevented. The risk of the tag detaching from the packaging is also reduced, thereby improving the durability of the product packaging.

Figure 10:
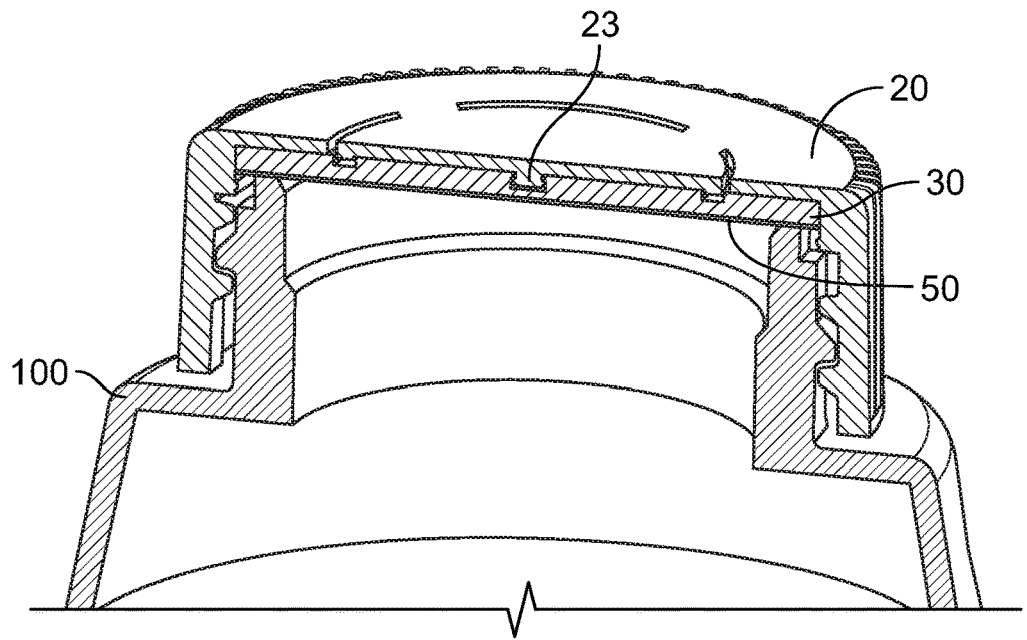
FIG. 10 is a cross sectional view of a closure similar to that contemplated in FIG. 2, but with an inductive tag, tab, or foil incorporated proximate to the disc for initiating and/or detecting the verification and anti-counterfeiting schemes disclosed herein.

FIG. 10 shows how an inductive foil and/or a tag 50 could be captured or attached to the disc 30 along its inner facing. The act of affixing the closure 10 could be sufficient to hold the tag/foil 50 in place.

Figure 11:
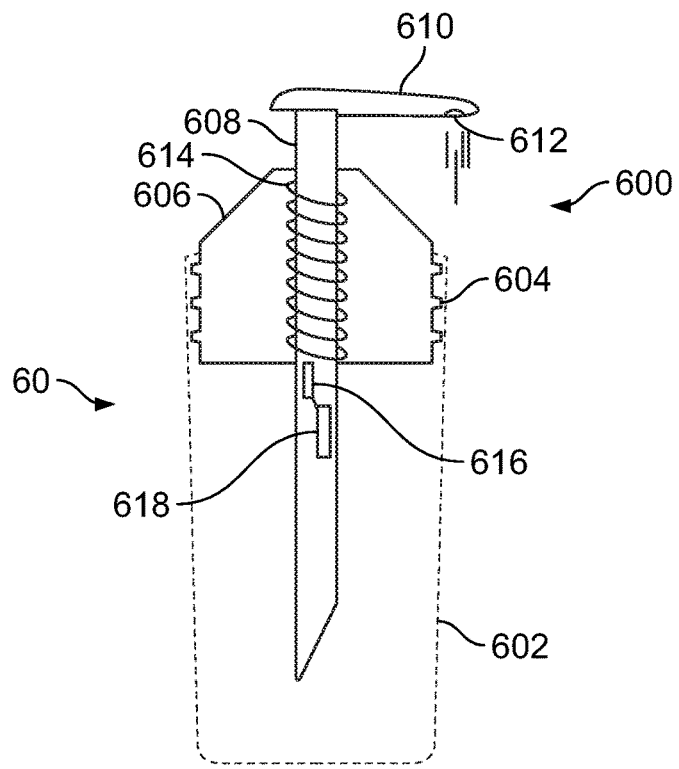
FIG. 11 is a cross sectional schematic view of a pump dispenser incorporating a wireless tag according to the disclosure herein.

As seen in FIG. 11 (described in more detail below), a pump dispenser for dispensing a liquid or other flowable product such as paste or cream, the pump dispenser incorporating a wireless communication tag; the tag having information pertaining to the pump stored thereon, and being configured to wirelessly transmit information pertaining to the pump when activated by a reader device; wherein the tag is incorporated into a pump mechanism of the pump. An actuation component may be coupled with the tag, for implementing the dispensing regime. The actuation component may be a valve or other flow-influencing structure such as a weir in, at or around a flow conduit and configured to move, e.g. open and close, according to the dispensing regime. Such a valve might be operated, actuated or initiated by electromagnetic, induction, piezoelectric or other mechanism. A MEMS (microelectromechanical) component may be used.

The pump dispenser may be reusable or disposable. In this or in any other aspect herein the dispenser may be a pump dispenser typically comprising a body and a plunger reciprocable relative to the body to alter the volume of a pump chamber defined in the body, such as by a piston and cylinder or bellows action, the pump chamber having an inlet to receive product from a reservoir thereof such as a container attached to the pump dispenser, and an outlet leading to a discharge channel Usually the inlet and/or outlet have a check valve. Preferred pumps have a plunger with an actuator head and a stem which carries a piston acting in a cylinder of the pump body.

In another embodiment, the container includes a user-operated dispensing mechanism for dispensing a product, such as piston pump or squeeze pump. In either case, the dispense mechanism includes an integrated active wireless communication tag having information pertaining to the product stored thereon. Actuation of the dispense mechanism to dispense the product may also generate an electrical signal, by way of a transducer, that is used to update the information and/or power an active tag. Additionally or alternatively, actuation may also be recorded by the tag or serve as a trigger for transmission of information from the tag, so as to allow for tracking of the total quantity of dispensed product and other, related information.

In other embodiments, the tag may interact with the device to update the information on the tag. This update could impose a new dispensing regime, prevent use under certain conditions, or otherwise inform the traits of the dispenser is used in the future. For example, temporal thresholds could be incorporated and/or altered in this manner so as to impose a minimum time or some other time-based restriction. In the same manner, quantitative thresholds could be employed to impose maximums or other limitations, e.g., by adjustment of the duration of dispensing, the flow rate (via changes to the pumping or outlet port), etc. Finally, by tracking dispensing events, proper dosing (or, via the foregoing thresholds) can be ensured for products requiring such monitoring.

A power source can be provided, particularly in embodiments with active tags, in order to activate or selectively enable the wireless functionality. This power source may be in the form of a thin-printed, coin, button cell, cylindrical or other type of battery. Selection of the power source will be dictated by the need for electrical current, lifespan of the battery, and the size and shape(s) into which the power source must be integrated.

Figure 12:
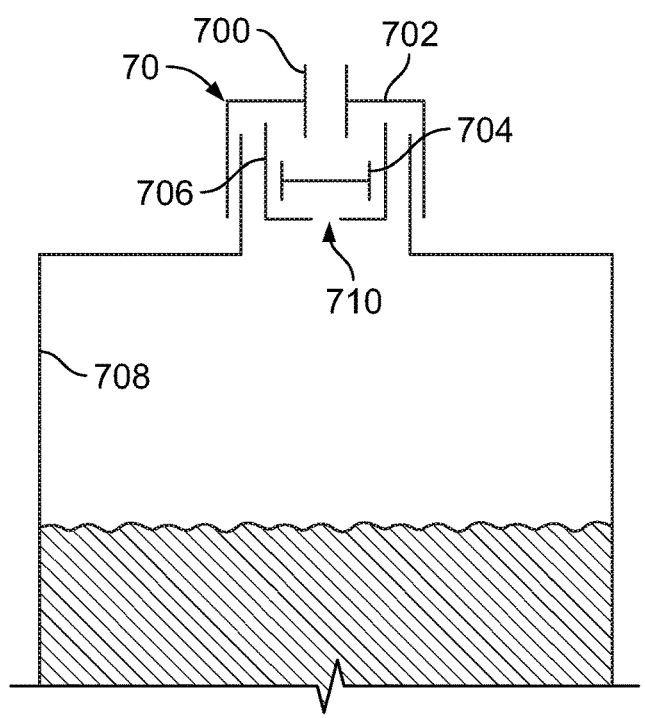
FIG. 12 is a cross sectional schematic view of a squeezable or deformable container incorporating a wireless tag according to the disclosure herein.

Alternatively, one or more transducers can be provided within or proximate to the tag. Generally speaking, transducers convert mechanical energy (i.e., in the form of motion) into electrical energy. Such transducers could be incorporated on one of the moving parts of a pump, as shown in FIGS. 11 and 12. That is, as the actuator for the dispenser moves through its range of motion, a cooperating transducer converts the energy from that movement into a usable electrical signal, e.g., to power an active tag. One example of a transducer is a piezoelectric device.

In FIG. 11, pump dispenser 600 is attached, via a closure with a fastening formation such as a thread 604, to a container 602 containing a liquid product (not shown) to be dispensed.

Pump dispenser 600 itself comprises a main body 606, shaft 608, and pump head 610. When a user presses pump head 610, a shaft 608 comprised with the head in a plunger of the pump mechanism is forced into reservoir 602. As the shaft 608 is forced into the reservoir, an internal pump mechanism (not shown) causes the liquid to be drawn or forced up the tube shown and out through the shaft 608, and dispensed from an outlet in the pump head 612. The mechanism is typically a piston and cylinder mechanism, as discussed above. Once the liquid has been dispensed, the user releases the pump head 610, at which point spring 614 returns the pump to its starting position. This completes a single pump cycle.

When a user performs a pump cycle, transducer 616, which is coupled to the pump mechanism, is deformed. As the piezoelectric is deformed, it produces an electrical signal, which in turn is fed into tag 618, thereby providing power for operating the tag 618. Accordingly, each time the pump is actuated by a user, power is supplied to tag 618. Accordingly, the active tag can operate without the need of a battery.

In FIG. 12, a dosing dispenser mechanism 70 for dispensing a fluid in separate doses from a reservoir 708, desirably a resiliently squeezable container.

Dispenser mechanism 70 comprises a closure cap 702, outlet tube 700, timing chamber 706, occluder 704 and timing aperture 710.

Figure 7A:
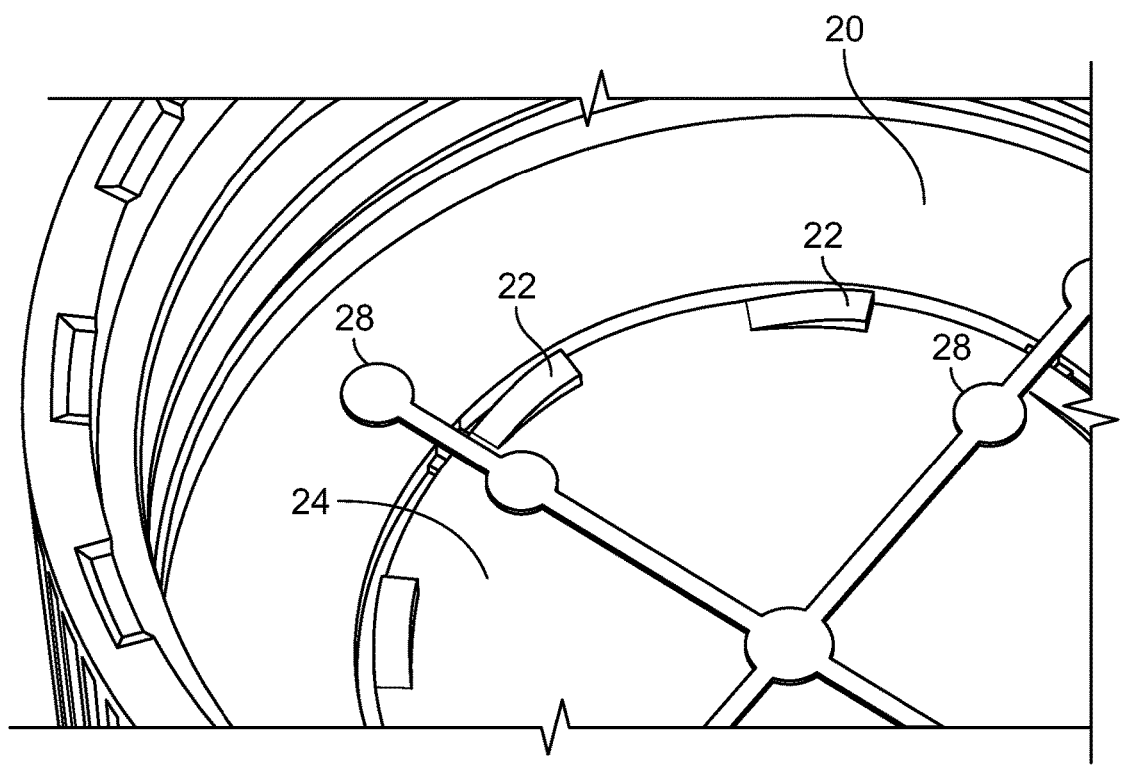
FIGS. 7A and 7B are sectional perspective views of the bottom (FIG. 7A) and the top (FIG. 7B) of the closure contemplated in FIGS. 6A, 6B, and 6C. Here, the conductive resin(s) form a path along tabs or bridges that initially connect the cap and the disc, although these tabs will break when sufficient torque is applied, so as to eliminate the conductive path and provide a potential anti-counterfeiting scheme according to the various schemes disclosed herein.
Figure 7B:
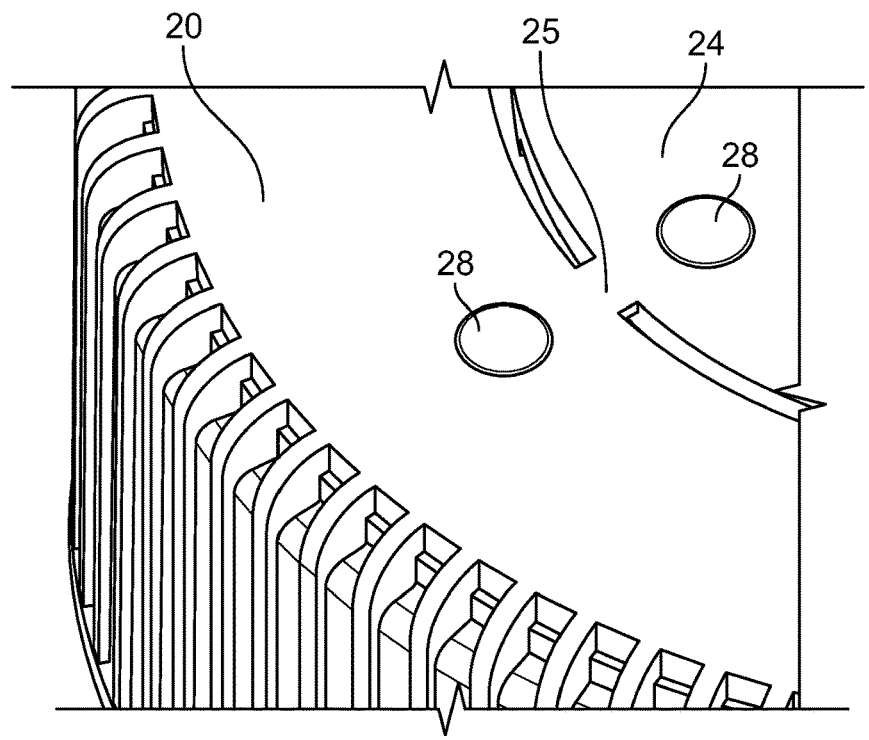
Figure 8:
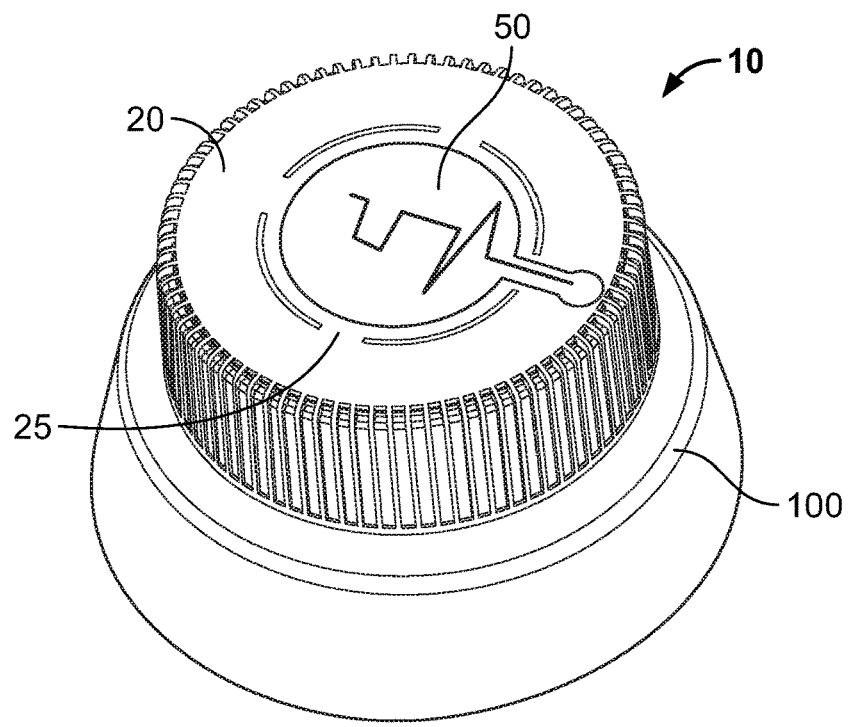
FIG. 8 is a perspective view of a closure similar to that contemplated in FIG. 2, with a thin-film, wireless tag incorporated on the cap and disc along a tab that is similar in construction and function to those shown in FIGS. 7A and 7B.

Dispenser mechanism 70 and reservoir 708 are shown in an upright position in FIG. 7. When the dispenser mechanism 70 and reservoir 708 are upturned, i.e. so that the fluid flows into closure cap 702, fluid is dispensed. In particular, when upturned, fluid flows into the timing chamber 706 and out of outlet tube 700. At the same time, fluid flows through timing aperture 710, thereby enabling occluder 704 to gradually move towards outlet tube 700 (where the speed at which it moves is regulated by the size of the timing aperture 710). Once the occluder 704 reaches the outlet tube 700, the outlet is blocked so that no more fluid can be dispensed and the dose terminates.

The dispenser can then be returned to an upright position, thereby enabling the occluder to return to its original position, ready for more fluid to be dispensed.

According to an implementation of the present invention, the dispenser 70 further incorporates a wireless tag (not shown) configured to impose a dispensing regime. For example, by providing the wireless tag with an actuator component for adjusting the diameter of the timing aperture 710, the speed at which the obturator moves towards the inlet opening and hence the dose size can be controlled.

For example, when a reader device communicates with the tag to reduce the amount of fluid dispensable in each dispense operation, the tag will then control the actuator component to reduce the diameter of the timing aperture 710, and in turn reduce the amount of fluid dispensable each time the dispenser is used.

Finally, the tag may be provided with one or more sensors, integrated chips, memory devices, and/or related circuitry (collectively referred to hereafter as "sensors and circuitry") to accomplish the aims described herein. Functionally, such sensors and circuitry are hard-wired and preferably molded along with the tag to ensure a durable construction.

Web-Based or Remote Access Verification, Authentication or Serialization Methods Components associated with one or more of the foregoing groupings can be combined with remotely located data servers. These data servers may merely store information or allow for dynamic and interactive aspects of the product to be developed. In particular, any number of arrangements could allow for authentication of the closure (and its associated container/products), cataloging of an end user's preferences or habits, serialization of the product itself by a middle party (e.g., a wholesaler or retailer), and other purposes as contemplated herein.

To the extent a remote data server is critical to these functions, systems and methods associated with this grouping will necessarily rely upon wireless communication. A preferred embodiment would involve the creation of an application or other software routine that is then installed on a user controlled computing device (e.g., a smart phone, a tablet, an e-reader, a laptop or mobile computer, etc.) equipped with appropriate wireless technologies (e.g., near field communications detectors, cameras, other sensors, etc.).

The application can include functionality to identify one or more users. The user(s)' information may be stored within the memory of the device running the application, remotely on a data server, or both (with periodic synchronization schemes provided). In some embodiments, the user may log-in using a profile in the application, so that any further activity during that log-in is automatically cataloged and indexed to that user. Algorithms could then be applied to further optimize the application and any information returned to the user from the remote servers (e.g., pertinent product information, opportunities to purchase related, ancillary products, etc.). Further still, geographic location devices associated with the computing device could be utilized to further augment the profile, algorithms, and/or overall user experience as might be appropriate to the circumstances.

In other embodiments, the remote storage of data allows for iterative treatment of data about the user, the closure, and/or the product within the container associated with the closure. That is, information about a particular closure may be created and added to as time goes on (this could prove particularly useful in an arrangement where a user might access information prior to and in support of a prospective purchase/use). Separately, from a supplier's perspective, data may be collected, tracked, and supplemented based on a wider scale.

Data storage may be leveraged on reader devices (e.g., mobile phones, laptop computers, etc.) that may be initially employed to interact with the closures and/or tags contemplated herein. As noted above, user profiles, dispensing and usage habits, and other traits can be stored on the reader device so as to interact directly with the closure/tag, thereby accomplishing the steps noted above.

In addition to authentication and/or anti-counterfeiting, the invention may include serialization by a middle party. That is, the closure may be formed with components from any combination of the groupings above, while the middle party provides a remote data server. Here, the middle party could create or assign product-specific information to a specific closure based upon the circumstances of the transaction by which the end user comes into possession of the closure. As above, this serialization could include an iterative element by which subsequent communications/requests from the end user about the specific closure are further tracked and leveraged. As above, a middle party could be a wholesaler, a retailer, a distributor within a supply chain, or any other entity that intervenes from the initial manufacture and containment of the product (via the inventive closure) and the final end user.

In any one or combination of the foregoing embodiments, the information pertaining to the product, either actively or passively associated with the tag/product or stored remotely as part of a remotely-based scheme, may include one or more of the following:

A product identifier code
A product serial number
An expiry date (where the product is perishable)
A link to a website address containing information about the product
A location of origin
Temperature(s) experienced by the product
Force(s) applied to the product
Humidity experienced by the product
Movements experienced by the product
Condition of perishable product
Quantity of dispensed product The sensors and other circuitry that might be useful in combination with the tags include any one or more of:

A thermocouple (for measuring temperature)
A strain gauge (for measuring forces)
An accelerometer (for measuring shocks, movements, and/or tilting of the product)

These are non-exhaustive lists. Indeed, given that NFC tags of the type discussed in this application can store data typically up to 8 kB, it is envisioned that any suitable combination of types of information could be used.

As noted above, the closure and method of closing contemplated herein provides one or more indicators for the user to easily determine whether the container has been compromised (i.e., without the user's knowledge, previously opened and/or surreptitiously adulterated/altered and then resealed). Therefore, methods of detecting counterfeit products, methods of serializing a product for subsequent, product- or user-specific datatracking, methods of authenticating the origin, contents, post-manufacturing history, and other characteristics of a closure associated with a specific product, and other methods are disclosed and encompassed by this disclosure.

All components should be made of materials having sufficient flexibility and structural integrity, as well as a chemically inert nature. The materials should also be selected for workability, cost, and weight. Common polymers amenable to injection molding, extrusion, or other common forming processes should have particular utility, although metals, alloys, and other composites may be used in place of or in addition to more conventional container and closure materials.

Generally speaking, the structures and objectives described above could be used to any one or combination of the following:

- Customer engagement: consumers can interact with the product and the brand, as well as provide basic information on topics such product use, container recycling, product and/or container life cycle, etc.
- Create dashboards: display real time and/or historical data and reports thereof
- Metrics: track customer usage of products, as well as assist in manufacturing processes and sales analytics
- User profiles: the data and tracking can be instrumental to create unique user profiles and experiences
- Reminders: usage and associated data can be used remind consumers of critical events (e.g., the need to purchase additional products, recommendations on related items, etc.)

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. An anti-counterfeiting closure, attachable to an opening on a container, comprising:
    a cap rotatably attachable to the opening, said cap having a central section with an attachment feature;
    a flat disc fitted on an underside facing of the cap so as to retain the disc between the cap and the container when a closing torque is applied to attach the closure to the opening, said disc coupled to the cap by the attachment feature so as to allow for rotation of the disc relative to the cap;
    a wireless communication tag embedded into the closure along at least one tab bridge formed along the planar surface defined by the disc and the cap;
    wherein at least one anti-back off post is formed on the disc so that, when an opening torque is applied to release the closure from the container, the anti-back off post(s) engage the container to cause the cap to rotate in comparison to the disc so as to cause the at least one tab bridge to disconnect upon rotation of the closure and engagement of the anti-back off post(s); and
    wherein the wireless communication tag is physically compromised to provide an authentication and/or anti-counterfeiting function when the tab bridge is disconnected.

2. The closure of claim 1 wherein the attachment feature comprises a receptacle formed on the disc to receive a corresponding protrusion formed on the cap so as to snap-fit the disc and the cap when the closing torque is applied.

3. The closure of claim 2 further comprising at least one anti-rotation ribs on the underside facing of the cap so as to allow the disc to rotate in only one direction.

4. The closure of claim 1 wherein the attachment feature comprises a receptacle formed on the cap to receive a corresponding protrusion formed on the disc so as to snap-fit the disc and the cap when the closing torque is applied.

5. The closure of claim 4 further comprising at least one anti-rotation ribs on the underside facing of the cap so as to allow the disc to rotate in only one direction.

6. The closure of claim 1 wherein a conductive ink or a conductive resin is associated with the tab bridge to create an electrical flowpath between features provided proximate to the central section and features provided proximate to a peripheral outer facing of the cap, said peripheral outer facing disposed concentrically around the central section.

7. The closure of claim 6 further comprising a power source connected to at least one of: the electrical flowpath and the wireless communication tag.

8. The closure of claim 6 wherein the features provided proximate to the central section include at least one raised contact on an externally exposed surface of the closure.

9. The closure of claim 6 wherein the features provided proximate to the peripheral outer facing include at least one raised contact on an externally exposed surface of the closure.

10. The closure of claim 6 wherein the electrical flowpath is formed on the underside facing of the cap.

11. The closure of claim 1 wherein a conductive resin is provided via a two-shot molding process to create the electrical flowpath.

12. The closure of claim 1 wherein a plurality of anti-back off posts are formed along an outer most circumference of the disc.

13. The closure of claim 1 wherein anti-rotation ribs are formed within the central section to facilitate rotation of a peripheral edge of the cap in comparison to the disc.

14. The closure of claim 13 wherein the central section of the cap remains coupled to the disc when the peripheral edge of the cap rotates.

15. The closure of claim 1 wherein the wireless communication tag is embedded by way of insert molding or over-molding.

* * * * *